Aug. 27, 1935.  S. OBAYASHI  2,012,579
HIGH SPEED VERTICAL SHAFT TYPE MOTOR
Filed Aug. 15, 1933
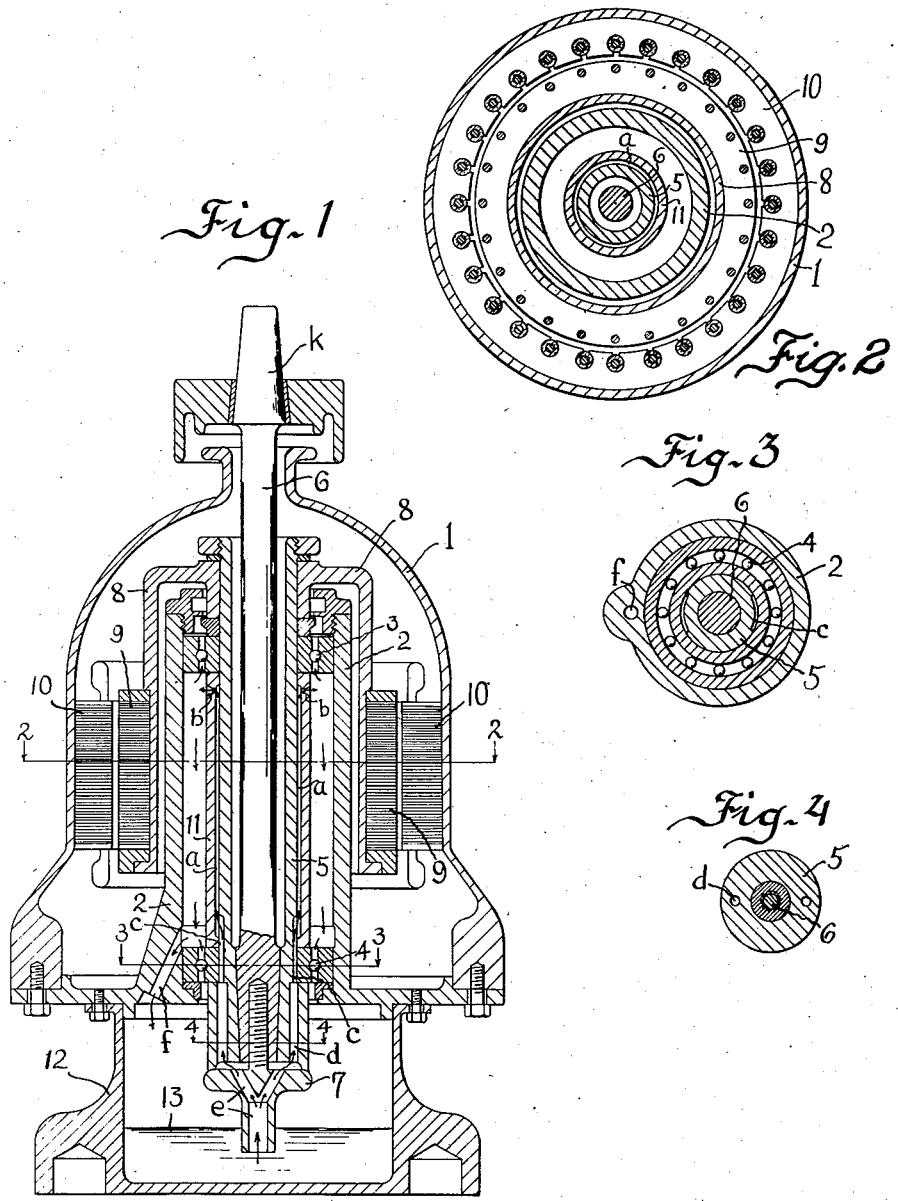
Inventor
SANKICHI OBAYASHI
By Emil Bönnelycke Patented Aug. 27, 1935

2,012,579

UNITED STATES PATENT OFFICE 2,012,579

HIGH SPEED VERTICAL SHAFT TYPE MOTOR

Sankichi Obayashi, Hitachi-cho, Japan, assignor to Kabushiki - Kaisha Hitachi - Seisakusho, Tokyo, Japan, a corporation of Japan Application August 15, 1933, Serial No. 685,297
In Japan August 26, 1932

4 Claims. (Cl. 308—187)

This invention relates to improvements in high speed vertical shaft type motors, such as those employed in the artificial silk industry for driving a spinning box or cup.

The ordinary construction for supporting the rotating shaft in such a motor comprises one bearing at the upper or the lower portion of the rotor, or two bearings at the upper as well as the lower portions thereof. In either case, however, the construction is subject to serious defects or inconveniences. More precisely, in the case where only one bearing is provided either at the upper or the lower portion of the rotor, even the slightest inaccuracy in the mounting of the bearing will produce a relatively large eccentricity in the orientation of the axial line of the rotating shaft of the motor, which inevitably brings about the nonuniformity of the air-gap between the stator and the rotor, and naturally a balanced operation of the motor will be impaired. Not only that, even upon a slight wear of the bearing the rotor will be subjected to a precessional motion. Again, in the case where the rotating shaft is supported by two separate bearings provided at the upper and the lower portions of the rotor, the construction is liable to become complicated and inconvenient for dismantling and re-assembling, as such operations are required at frequent intervals in this kind of motor. Moreover, in this case the overall height of the machine is liable to become excessive and the complicated construction renders the lubrication more difficult.

According to the present invention, a bearing support is provided extending upwardly and axially of the motor from the lower portion of the motor body and forms a casing for housing two ball bearings, of which one is provided at the upper and the other at the lower portion of the said support. The inner rings of the said bearings support a hollow shaft, with the lower end of which is rigidly connected a flexible shaft, which extends vertically and is adapted to support at the top thereof a body to be driven. To the upper portion of the said hollow shaft is rigidly connected a member which extends first horizontally and then vertically downwardly along the said bearing support, forming in this manner a body shaped like a bell jar and adapted to support a rotor.

Fig. 1 is a longitudinal section of one embodiment of the motor according to the invention.

Fig. 2 is a transversal sectional view thereof, the section being taken along the line 2—2 of Fig. 1.

Fig. 3 is a cross sectional view taken along the line 3—3 of Fig. 1.

Fig. 4 is also a cross sectional view taken along the line 4—4 of Fig. 1.

Referring to the drawing, 1 designates the outer casing of the motor, 2 the tubular bearing support extending axially and upwardly from the bottom portion of the outer casing, 3 and 4 the two ball bearings provided at the upper and the lower portion of the bearing support, 5 the hollow rotating shaft supported in the vertical position by the said ball bearings, and 6 the flexible shaft which is rigidly connected at its lower portion to the hollow shaft 5. The lower portion of the flexible shaft is conical and is inserted into a correspondingly shaped conical bore formed at the lower portion of the hollow shaft, a firm connection between them being assured by the set screw 7. The top end $k$ of the flexible shaft 6 is adapted to support a spinning box or other driven body (not shown). 8 is a member for supporting the rotor and is fixed to the upper portion of the hollow shaft. This member, which is shaped like a bell jar, has a depending portion extending along the external periphery of the bearing support 2 to form a seat for mounting the rotor 9. 10 is a stator. 11 is a sleeve fitted on the outside of the hollow shaft 5 in the region lying between the two ball bearings 3 and 4 and serves as a spacing or distance piece for the inner races of these bearings.

The inner surface of the sleeve 11 is carved out, as at $a$, to provide a passage for lubricating oil, which passage communicates at its upper end with the interior of the tubular bearing support 2 by means of the orifice $b$ and at its lower end with the reservoir 12 through the intermediary of a channel $c$ formed on the lower portion of the hollow-shaft 5, duct $d$ bored in the body of the hollow shaft and a channel $e$ formed in the set screw 7, the end of the channel $e$ immersing into the lubricating oil 13 contained in the reservoir. When the rotor turns, the oil is raised by a centrifugal force through the channel $e$, as is shown by arrow-heads, and passing through the ducts $c$ and the channel $a$ jets out from the orifices $b$, and in this manner an efficient lubrication of the two bearings is effected. $f$ is the channel of discharge for allowing the oil to return to the reservoir.

It will be seen from the above description that owing to the fact that the hollow shaft 5 is supported by two ball bearings mounted on the inside of the tubular bearing support 2, the entire rotating system is supported in a very stable and secure manner, so that the hollow shaft 5 will rotate maintaining the normal upright position even if the flexible shaft 6 may vibrate. Consequently, the rotor 9 supported by shaft 6 will be assured of a stable operation. Moreover, the rotor 9 being disposed intermediately of the two ball bearings which are separated in the vertical direction, the uniformity of the air gap of the motor will not be appreciably affected even though the hollow shaft 5 may vibrate to a certain extent. Aside from this, the fact that the center of gravity is situated between the upper and lower bearings serves to increase the stability of operation of the motor.

Further advantages derivable from the invention are that the over-all axial length of the motor is decreased, that the dismantling and the subsequent re-assembling are facilitated and that the lubricating system is simplified owing to the fact that the two bearings are disposed inside the same bearing support.

What I claim is:

1. In a high speed drive, a hollow shaft, a driving member affixed to the upper end of said hollow shaft, a driven shaft extending axially of and secured to the hollow shaft, bearing means comprising a tubular support provided outwardly of and concentrically of the said hollow shaft, two ball bearings provided between the said tubular support and the hollow shaft substantially at the upper and the lower end thereof, a sleeve provided on the outside of the hollow shaft serving as a spacing piece for the two bearings, a passage for lubricating oil formed between the said tubular support and the said sleeve, another passage for oil formed between the said sleeve and the hollow shaft and communicating at the lower end thereof with an oil reservoir and at the upper portion with the passage formed between the tubular support and the sleeve, and a set screw for firmly securing together the end portions of the said hollow shaft and the axially extending driven shaft and provided with an inclined oil channel communicating on one hand with the passage between the sleeve and the hollow shaft and on the other hand with the said oil reservoir.

2. In a bearing for a high speed vertical shaft type drive, a base, a hollow bearing support extending vertically and upwardly from said base, a ball bearing provided at the upper and the lower portions of said bearing support, a hollow shaft carried by said bearings and mounted concentrically within the bearing support, a flexible shaft fixed at the lower end thereof to the lower end of said hollow shaft, a sleeve mounted concentrically upon the hollow shaft so as to form therebetween a passage for lubricating oil, which passage opens at its upper end into the interior of the bearing support intermediately of the two ball bearings, and a set screw for firmly connecting said hollow and flexible shafts together, said set screw having a duct extending therethrough, the upper end of which communicates with said passage, the lower end of which communicates with an oil reservoir, and the intermediate portion being inclined to centrifugally create a flow of oil therethrough upon rotation of said shaft.

3. In a bearing for a high speed vertical shaft type drive, a base, a hollow bearing support extending vertically and upwardly from said base, a ball bearing provided at the upper and the lower portions of said bearing support, a hollow shaft carried by said bearings and mounted concentrically within the bearing support, a flexible shaft fixed at the lower end thereof to the lower end of said hollow shaft, a sleeve mounted concentrically upon the hollow shaft to form therebetween a passage for lubricating oil, which passage opens at its upper end into the interior of the bearing support intermediately of the two ball bearings, a set screw for firmly connecting said hollow and flexible shafts together, said set screw having a duct extending therethrough, the upper end of which communicates with said passage, the lower end of which communicates with an oil reservoir, and the intermediate portion being inclined to centrifugally create a flow of oil therethrough upon rotation of said shaft, and a channel provided in the lower portion of the bearing support above the lower bearing for the return of oil to the reservoir.

4. A vertical shaft high speed drive comprising a tubular bearing support, a hollow shaft positioned concentrically in said support in spaced relation thereto, upper and lower bearings for rotatably supporting said hollow shaft in said support, a sleeve mounted on said hollow shaft for maintaining said bearings in axially spaced relation on said hollow shaft, said sleeve intermediate its ends being provided with a passage between the same and the hollow shaft, ducts formed in the lower end of the hollow shaft communicating with said passage, the lower internal portion of said hollow shaft being in the form of a tapered socket, a flexible shaft having its lower end received in said socket and extending upwardly through and concentrically of said hollow shaft, the lower end of said flexible shaft having a screw-threaded socket provided axially thereof, a stud received in said threaded socket for retaining said shaft in said tapered socket, and means provided in said stud for creating a flow of a lubricant through said ducts and passage.

SANKICHI OBAYASHI.